(12) United States Patent
Wade et al.

(10) Patent No.: US 8,564,246 B2
(45) Date of Patent: Oct. 22, 2013

(54) BATTERY CHARGING SYSTEM AND METHOD

(75) Inventors: John M. Wade, Ramona, CA (US); Jaime H. Bohorquez, Escondido, CA (US)

(73) Assignee: Grrreen, Inc., Del Mar, CA (US)

( * ) Notice: Subject to any disclaimer, the term of this patent is extended or adjusted under 35 U.S.C. 154(b) by 386 days.

(21) Appl. No.: 13/075,137

(22) Filed: Mar. 29, 2011

(65) Prior Publication Data
US 2011/0241623 A1 Oct. 6, 2011

Related U.S. Application Data

(60) Provisional application No. 61/319,187, filed on Mar. 30, 2010.

(51) Int. Cl.
*H02J 7/00* (2006.01)
(52) U.S. Cl.
USPC ........................................... 320/119; 320/125

(58) Field of Classification Search
USPC .......................................................... 320/119
See application file for complete search history.

(56) References Cited

U.S. PATENT DOCUMENTS

| 5,825,155 A * | 10/1998 | Ito et al. ......................... 320/118 |
| 2003/0052647 A1 * | 3/2003 | Yoshida et al. ................ 320/125 |
| 2007/0222416 A1 * | 9/2007 | Sato .............................. 320/128 |

\* cited by examiner

*Primary Examiner* — Arun Williams
(74) *Attorney, Agent, or Firm* — Bernard L. Kleinke; Duckor Spradling Metzger & Wynne

(57) ABSTRACT

A battery charging system and method, includes a high voltage charger for charging a group or string of series connected battery cells, and a group of individual cell chargers for charging individual ones of the cells. The charging technique includes detecting at least one cell being charged to a predetermined voltage, and then inhibiting the high voltage charger from further charging any of the cells. The individual cell chargers charge individual ones of the cells, except the at least one cell charged to the predetermined voltage.

14 Claims, 4 Drawing Sheets

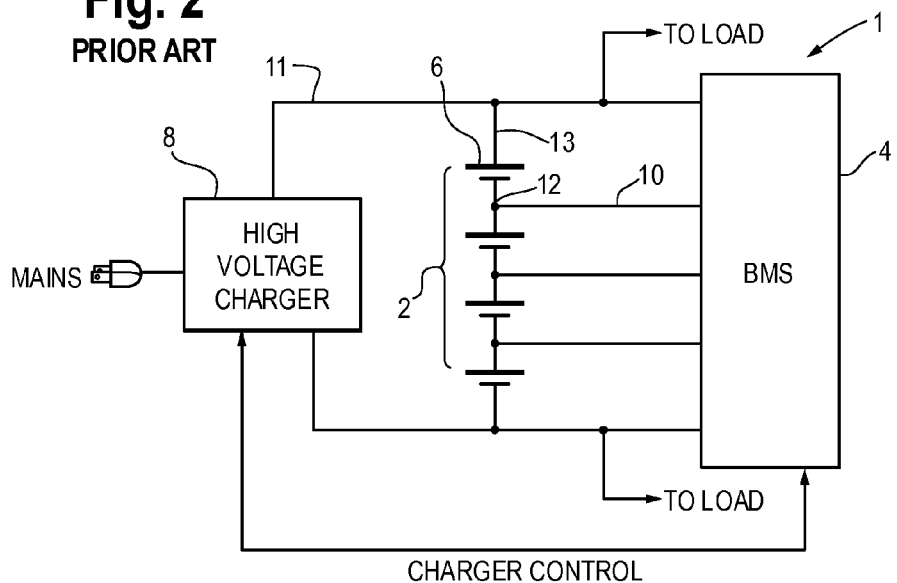
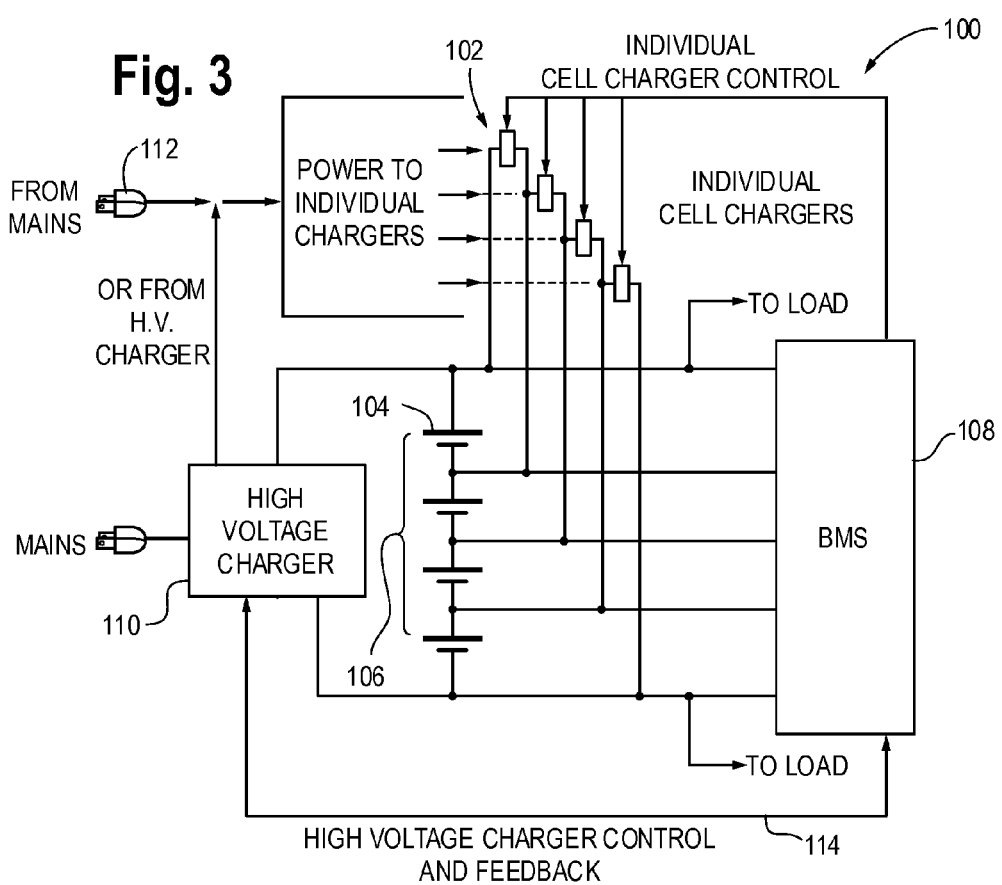

BATTERY CHARGING SYSTEM AND METHOD

RELATED PATENT APPLICATIONS

This present non-provisional patent application hereby claims priority to U.S. provisional patent application No. 61/319,187, filed Mar. 30, 2010, for BATTERY CHARGING SYSTEM AND METHOD, which is incorporated herein by reference.

This present non-provisional patent application hereby incorporates by reference U.S. patent application Ser. No. 13/075,145, filed Mar. 29, 2011, entitled INTELLIGENT BATTERY MANAGEMENT SYSTEM AND METHOD; U.S. patent application Ser. No. 13/075,152, filed Mar. 29, 2011, entitled INDIVIDUAL CELL CHARGER AND METHOD OF USING SAME; and U.S. patent application Ser. No. 12/650,401 filed Dec. 30, 2009, entitled SYSTEMS AND METHODS FOR MANAGING CHARGE AND DISCHARGE FOR BATTERIES.

FIELD OF THE INVENTION

The present invention relates in general to a battery charging system and method, and it more particularly relates to such a system and method for managing the charging of multiple cell batteries efficiently and effectively.

BACKGROUND ART

There is no admission that the background art disclosed in this section legally constitutes prior art.

There are many different kinds and types of battery powered devices and apparatus. For example, battery powered vehicles are coming into increasing use. New battery technologies such as Lithium Ion are playing an increasing role in that application. One of the most important considerations for them is their range. While Lithium Ion cells provide substantial advantages over the old lead acid technology, such as larger capacity to weight and capacity to volume ratios, they have also presented certain challenges to realizing their full potential. In an application such as electrically powered vehicles, it is necessary to connect cells in series in order to achieve practical voltage levels to be compatible with available controllers and motors.

Doing so presents an issue relating to battery cell balance. If one cell in a series string charges significantly differently from the others, it can cause performance to be degraded. For example, many cell strings or battery packs use a Battery Management System (BMS) to monitor battery conditions. Since cells are normally charged in series by one charger, a single cell in a string having a voltage that is too high during the charge cycle may trigger the BMS to shut down the charger. If that high cell had a voltage much higher than the others in the battery packs, the others could have had their charge cycle terminated prematurely in order to protect the high cell. Thus, the other cells may not be fully charged, thereby resulting in the vehicle range being undesirably reduced.

Conversely, during discharge, a cell that has a voltage much lower than the others could trigger the BMS to initiate vehicle shut down, even though the other cells may have had reserve capacity, once again reducing the range undesirably. It can be seen that both unbalanced high, and unbalanced low cells may cause the previously described range problems.

A charge imbalance can occur from several sources. For example, different cells in series may store energy at different rates even though they all share the same charge current. Also, some cells in use may have more discharge current than others if, for example, they comprise a portion of the cells that are sometimes used to power a low voltage load such as lights. Thus, it may be desirable for some applications to provide substantial charge balance in a series string of cells, to improve the amount of useable energy stored in them. In a vehicle application, this may provide the delivery of an improved range for given applications.

In the past, several approaches have been taken in an attempt to accomplish balance in a series string of cells. A common approach has been to compare voltages of the different cells during charge, and shunt some current around the higher voltage cells to reduce their charge current while leaving the full current flowing through the lower voltage cells. This approach may work for some chemistry batteries, but not well for Li-Ion chemistry cells. One reason is that for some applications, it may well be difficult or impossible to determine the amount of the state of charge on individual cells during the charging process.

This limitation can be seen by referring to FIG. 1. Here, the voltage is shown as a function of energy flowing into a partially discharged Li-Ion cell. It can be seen that the voltage is almost constant during most of the charging process, and only changes near the end of charge. It is therefore difficult to determine the state of charge by looking at the cell voltage until it is almost completely charged. Because of this, cells with differing states of charge may not be accurately differentiated from one another during most of the charge process, and therefore appropriate current shunting may not readily be accomplished at least for some applications. When voltage differences do become evident, the charge is nearly complete for the highest cells, and it may be too late to accomplish a balance by making a modest reduction in the current through them, since the conventional BMS may turn off all charging when the first cell may be fully charged and its voltage may reach the maximum allowable. At that point, the lower voltage cells may not be fully charged, and thus, the imbalance may remain.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein:

FIG. 2 is a simplified block diagram of a prior known battery charger;

FIG. 3 is a block diagram of a battery charger system, which is constructed according to an embodiment of the present invention.

DETAILED DESCRIPTION OF CERTAIN EMBODIMENTS OF THE INVENTION

Figure 1:
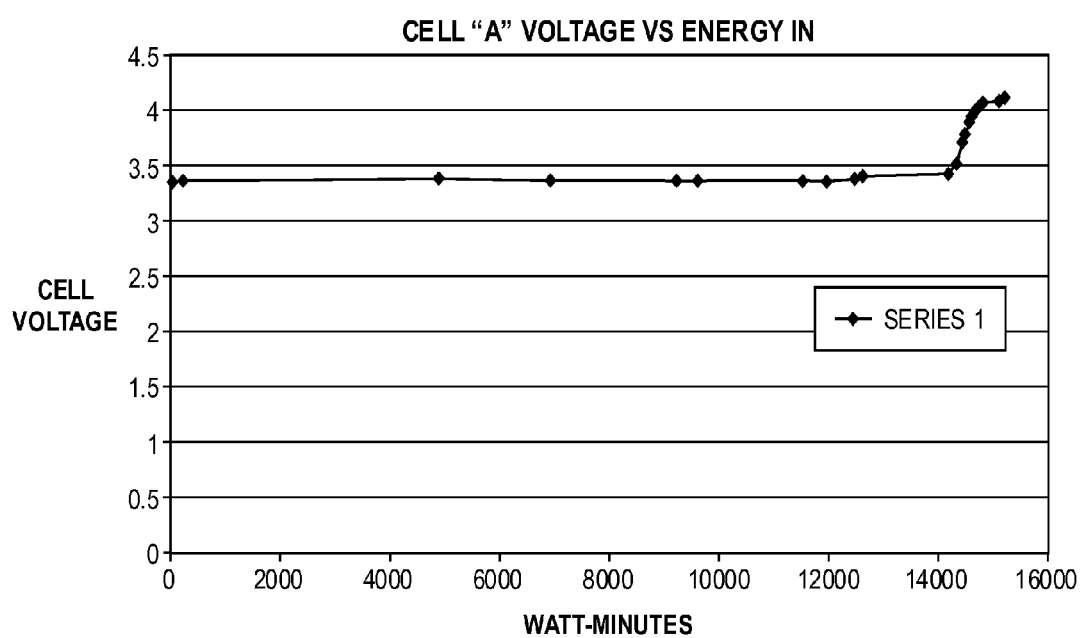
FIG. 1 is a graph illustrating a Lithium Ion battery cell voltage verses the energy supplied to the cell.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

In accordance with at least one embodiment of the present invention, there is provided a battery charging system and method, including a high voltage charger for charging a group or string of series connected battery cells, and a group of individual cell chargers for charging individual ones of the cells. The charging technique includes detecting at least one cell being charged to a predetermined voltage, and then inhibiting the high voltage charger from further charging any of the cells. The individual cell chargers charge individual ones of the cells, except the at least one cell charged to the predetermined voltage.

According to certain embodiments of the invention, the individual cell chargers continue to charge the individual cells until each one is charged to the predetermined voltage. As each cell reaches that voltage level, its individual cell charger is inhibited from further charging its cell.

According to the other embodiments of the invention, the individual cell chargers may charge their individual cells at the same time the high voltage charger applies charging current through the series connected cells. Thus, when the high voltage charger becomes inhibited, the individual cell chargers continue to supply charging current to their individual cells.

According to certain embodiments of the invention with reference to the drawings, an apparatus for charging batteries, and the method for doing the same, are disclosed. Referring now to FIG. 2 of the drawings, there is illustrated a schematic diagram of a known, prior-art apparatus 1, configured for charging a string of individual battery cells generally indicated at 2, forming a battery pack connected in series. A BMS 4 monitors the state of charge of each individual cell such as cell 6. The BMS 4 may be of any appropriate type known in the art, such as, for example, the BMS described in U.S. patent application Ser. No. 12/650,401, filed Dec. 30, 2009, incorporated herein by reference. A high-voltage charger 8 outputs a voltage appropriate across the entire string of series connected cells 2, and the same charge current flows through each of the cells 6. It can be seen that the BMS 4 has a pair of connections such as connections 10 and 11 each cell such as the cell 6, to each of the cell terminals such as cell terminals 12 and 13 of the cell 6, in order to monitor the voltage of the respective cells such as the cell 6. The BMS 4 monitors the voltage of each cell such as the cell 6 and may be configured to terminate the charge current if the voltage of any cell such as the cell 6 reaches a pre-determined upper voltage limit.

Referring now to FIGS. 3 and 4 of the drawings, there is shown a battery charging system 100 for charging a battery generally indicated at 106 comprised of series connected cells such as a cell 104, in accordance with an embodiment of the present invention. It should be understood that while only four cells are illustrated in FIG. 3, a fewer number or a larger number of cells may be charged by the system 100. FIG. 4 illustrates a flowchart for a method of using the embodiment of the invention shown in FIG. 3, to charge batteries. The system 100 illustrated in FIG. 3 provides individual cell chargers generally indicated at 102 for each individual cell such as the cell 104 of the string of cells connected in series generally indicated at 106. A BMS 108 monitors the state of charge of the battery 106 and individual cells such as the cell 104.

During the charging process, each individual cell charger 102 monitors the voltage of each respective individual cell such as the cell 104, and compares the voltage to a predetermined upper voltage target. If the voltage of a cell such as the cell 104 is below the predetermined upper voltage target, the associated individual cell charger 102 continues to inject charging current into the cell 104, until the predetermined upper voltage target is reached.

This process may occur concurrently with charging current flowing from a high-voltage charger 110 through the series connected cells of the battery 106. Thus a depleted battery 106 may receive current from both the high voltage charger 110, and individual cell chargers 102 at the same time. Alternatively, the individual cell chargers 102 may start charging individual cells only after the high-voltage charger 8 is inhibited.

When the voltage of any cell reaches a predetermined upper limit, the BMS 108 turns off or otherwise inhibits the high-voltage charger 110 from further charging the whole string of cells. Also the individual cell chargers 102 are turned off or otherwise inhibited from further charging its associated cell such as the cell 104 that has reached the predetermined upper voltage limit. However, the individual cell chargers 102 for the remaining cells continue to charge their associated cells until they each also reach the upper limit. Thus the individual cell chargers 102 continue charging their associated cells until the voltage of each of the cells reaches the predetermined upper voltage limit.

Charge balance is thus achieved for all cells 104 in the string of cells of the battery 106. It is advantageous and presently preferred for the two forms of charging to work together harmoniously simultaneously, as described, because each has its own strength. The high voltage charger 110 is typically capable of delivering high charge currents, and thus injects energy into the cells 106 very quickly. The individual cell chargers 102 are capable of providing relatively smaller charge current outputs, in order to improve the efficiency and economy of this embodiment. Since the individual cell chargers 102 are only making up the difference in charge balance between the cells 106, their current delivery rate is adequate to charge their associated cells 106 up to a predetermined upper voltage limit within a reasonable time.

Still referring to FIG. 3, in other embodiments of the invention, the power for the individual cell chargers 102 may be supplied either directly from a power main 112, or from the high voltage charger 110, depending on the application. The BMS 108 ensures that power is never drawn from the cell string 106 when neither the mains, nor the charger 110 is available to power the individual cell chargers 102. The BMS 108 does so using the information provided via the high voltage charger control/feedback line 114. This is done because the cell string 106 is incapable of raising its own voltage and may otherwise discharge undesirably.

Figure 4A:
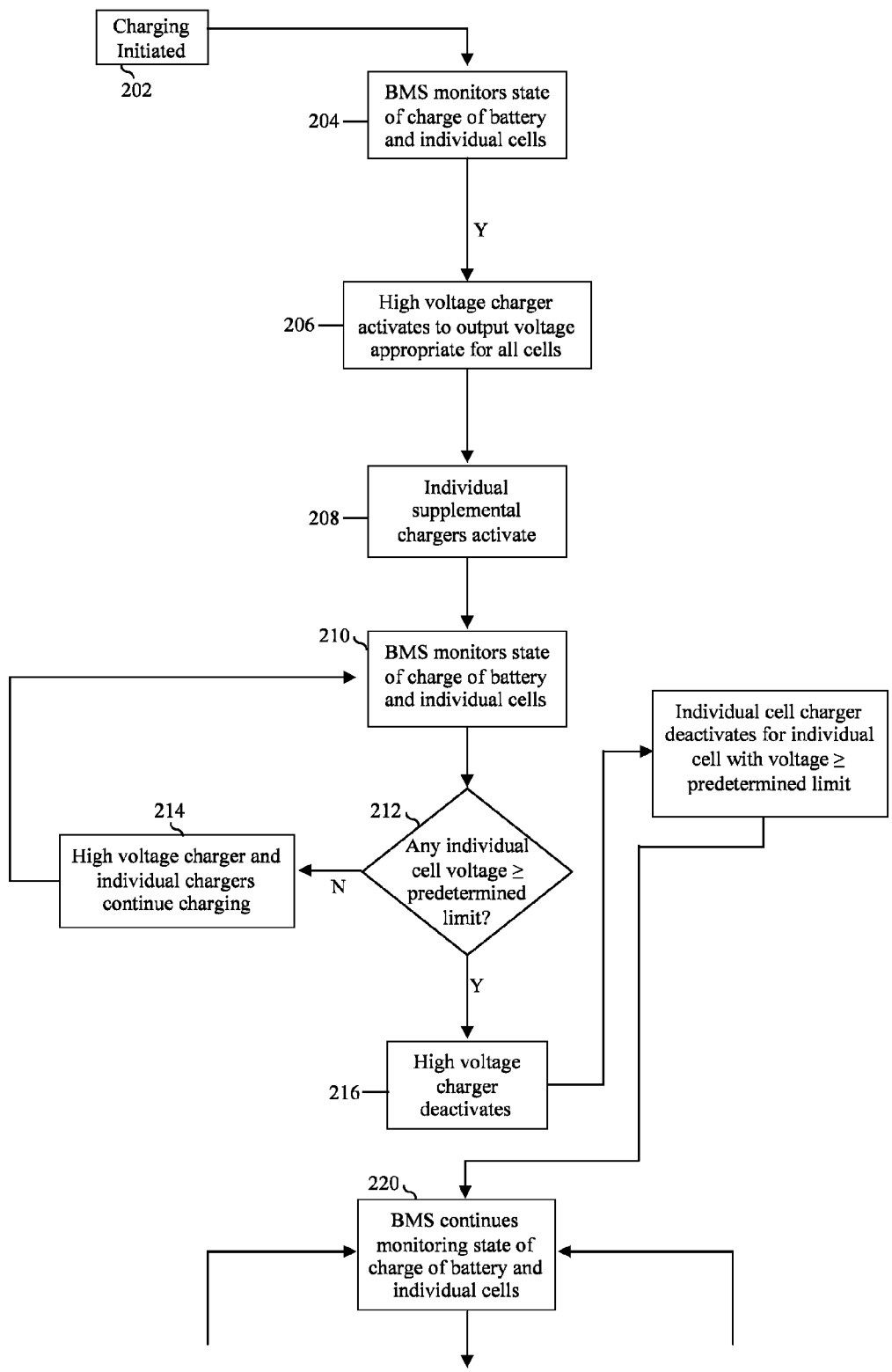
FIGS. 4A and 4B comprise a flow chart diagram of a method of operating the system of FIG. 3.

Referring now to FIG. 4 of the drawings, there is illustrated a flowchart 200 describing a method of using the apparatus of the present invention to charge batteries, in accordance with an embodiment of the invention. FIG. 3 is also referred to, in connection with the description of FIG. 4, to illustrate how components of the apparatus may function to carry out the steps of the method. When charging is initiated at box 202 of FIG. 4A, and during the charging process, the BMS 108 monitors the state of charge of the battery and individual cells, and controls the operation of the high-voltage charger 110 and the individual low-voltage cell chargers 102, as shown by box 204 of the flowchart. In an embodiment of the invention, during the charging process, the high-voltage charger 110 may activate to provide a high-voltage charge current appropriate for all cells, as shown by box 206 of the flowchart. Box 208 of the flowchart of FIG. 4A indicates that, during the charging process, the individual low-voltage cell chargers 102 may activate to provide a low-voltage charge current to respective individual cells 104. Box 210 illustrates that, during the charging process, the BMS 108 continues to monitor the state of charge of the battery and individual cells 104, and control the operation of the high-voltage charger 110 and the individual low-voltage cell chargers 102.

As charging continues, the voltage of each individual cell 104 is monitored and compared to a predetermined upper voltage limit, as shown in decision box 212. In an embodiment of the invention, if the voltage of any individual cell 104 has not reached or exceeded a predetermined upper voltage limit, the high-voltage charger 110 and individual low-voltage chargers 102 continue charging, as shown in box 214, and monitoring of the state of charge of the battery and individual cells 104 continues (box 210).

If, however, the ongoing monitoring of the individual cells 102 indicates that one or more individual cells 104 has reached or exceeded a predetermined upper voltage limit, then the BMS 108 deactivates the high-voltage charger 110, as seen in box 216. In this event, the BMS 108 may also deactivate the individual low-voltage cell charger 102 associated with the one or more cells such as the cell 104 that has reached or exceeded a predetermined upper voltage limit, as illustrated in box 218. Following deactivation of the high-voltage charger 110, and of the low-voltage individual charger 102 associated with the one or more cells such as the cell 104 that has reached or exceeded a predetermined upper voltage limit, the low-voltage individual chargers 102 associated with a number of cells such as the cell 104 that has not reached the predetermined upper voltage limit continue charging this number of cells. Also, the BMS 108 continues monitoring the state of charge of the battery and the individual cells such as the cell 104, and controlling the high-voltage charger 110 and low-voltage individual chargers 102, as shown by box 220.

If the ongoing monitoring by the BMS indicates that no additional cells that has reached a predetermined upper voltage limit, then charging by the individual low-voltage cell chargers 102 continues until another one or more of these cells such as the cell 104 reaches the predetermined upper voltage limit, as seen in decision box 222, and box 224.

Figure 4B:
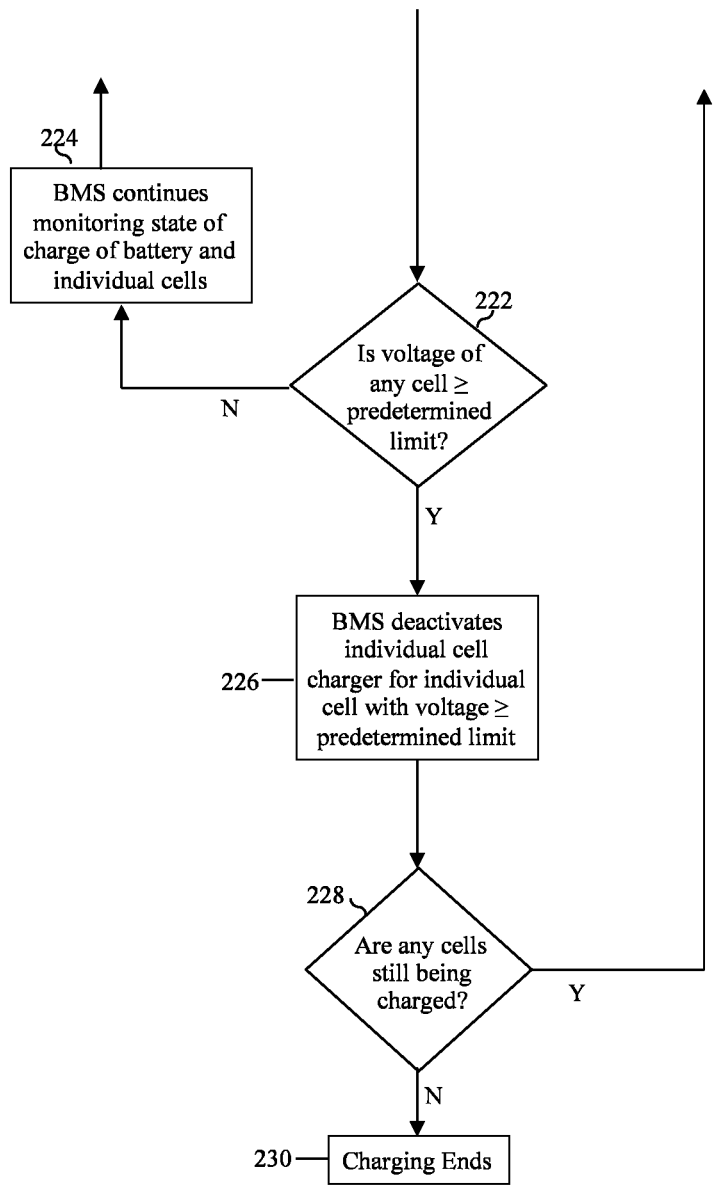

If, however, as seen in decision box 222 of FIG. 4B, the continued cell monitoring indicates that at least one of the cells such as the cell 104 reaches or exceeds the predetermined upper voltage limit, then the BMS 108 deactivates the individual charger of the low-voltage individual charger 102 associated with the one at least cell such as the cell that has reached a predetermined upper voltage limit, as shown in box 226 of FIG. 4B. In an embodiment of the invention, low-voltage charging will continue for the number of cells that has not reached a predetermined upper voltage limit. That is, the one or more low-voltage individual chargers 102 will continue charging the associated at least one cell such as cell 104 that has/have not reached a predetermined upper voltage limit. As long as any one or more cells 104 continue to be charged in this fashion, as seen in decision box 228, the BMS 108 continues monitoring the state of charge of the battery and individual cells such as the cell 104, and continues deactivating the low-voltage individual charger 102 for any cell that reaches a predetermined upper voltage limit. Once the continued monitoring of the individual cell voltages indicates that all of the cells in the battery 106 have reached a predetermined upper voltage limit, and the individual cell charger 102 has been deactivated for each of the cells such as the cell 104 in the battery 106 (i.e., no cells 104 are being charged), then the charging process ends, as seen in decision box 228 and box 230.

It is to be noted that the sequence of steps in the charging process described by the present invention is not limited to the sequence presented herein. Other embodiments, sequences, and variations of the steps in the charging process described herein, are contemplated within the scope of the invention.

While particular embodiments of the present invention have been disclosed, it is to be understood that various different modifications are possible and are contemplated within the true spirit and scope of the appended claims. There is no intention, therefore, of limitations to the exact abstract or disclosure of embodiments herein presented.

What is claimed is:

1. A method for charging Lithium Ion batteries, such method comprising the steps of:
    applying using a high voltage charger and or group of individual cell chargers, a charge current to a battery including a string of a plurality of battery cells connected in series, the charge current including a high-voltage component applied across the string of battery cells and a low-voltage component applied across each individual battery cell;
    continually monitoring using a battery management system, the state of charge of each of the plurality of cells;
    discontinuing the high-voltage component of current when one or more of the cells reaches a predetermined upper voltage limit;
    discontinuing the low-voltage component of current to the one or more cells that has reached the predetermined upper voltage limit;
    continuing to apply the low-voltage component of current to each of the plurality of cells that has not reached a predetermined upper voltage limit;
    selectively discontinuing the low-voltage component of current to each of the plurality of cells that reaches a predetermined upper voltage limit.

2. The method according to claim 1, wherein using the battery management system, controlling the operation of the high-voltage charger and the individual low-voltage cell chargers, and continuing to monitor the state of charge of the cells during charging.

3. The method according to claim 2, wherein using the battery management system, monitoring the state of charge of the cells when the battery is not being charged.

4. The method according to claim 2, wherein using the battery management system, monitoring and comparing to a predetermined upper voltage limit, the voltage of each individual cell.

5. The method according to claim 4, during the continued charging of the cells, using the battery management system, deactivating the low-voltage individual charger associated with at least one cell reaches the predetermined upper voltage limit, and continuing charging the other remaining cells that have not reached the predetermined upper voltage limit.

6. The method according to claim 5, wherein determining using the battery management system, that all of the cells have reached their predetermined upper voltage limit and all of the individual cell chargers have been deactivated, and then terminating the charging operation.

7. A method for charging a battery including a string of series connected cells, comprising:
    charging the battery with a high voltage charger;
    detecting at least one of the cells being charged to a predetermined voltage by a battery management system;
    inhibiting the high voltage charger from further charging any of the cells in response to said detecting; and
    charging individual ones of the cells by individual cell chargers, wherein all of the cells are continued to be charged, except the at least one of the cells.

8. The method according to claim 7, wherein using the battery management system, controlling the operation of the high-voltage charger and the individual low-voltage cell chargers, and continuing to monitor the state of charge of the cells during charging.

9. The method according to claim 8, wherein using the battery management system, monitoring the state of charge of the cells when the battery is not being charged.

10. The method according to claim 8, wherein using the battery management system, monitoring and comparing to a predetermined upper voltage limit, the voltage of each individual cell.

11. The method according to claim 10, during the continued charging of the cells, using the battery management system, deactivating the low-voltage individual charger associated with at least one cell reaches the predetermined upper voltage limit, and continuing charging the other remaining cells that have not reached the predetermined upper voltage limit.

12. The method according to claim 11, wherein determining using the battery management system, that all of the cells have reached their predetermined upper voltage limit and all of the individual cell chargers have been deactivated, and then terminating the charging operation.

13. A system for charging batteries including a string of series connected cells, comprising:
   a high voltage charger for charging the string of cells;
   a group of individual cell chargers for charging individual ones of the cells;
   a battery management system for detecting at least one of the cells being charged to a predetermined voltage, and then inhibits the high voltage charger from further charging any of the cells; and
   wherein the individual cell chargers charge individual ones of the cells except the at least one cell charged to the predetermined voltage.

14. A battery charging system for charging a Lithium Ion battery including a string of individual battery cells connected in series, comprising:
   a battery management system,
   a high-voltage battery charger connected electrically across the string of series connected cells;
   a plurality of low-voltage battery cell chargers, wherein the number of low-voltage battery chargers equals the number of cells in a battery being charged by the system, and each low-voltage charger is in electrical communication with one of the battery cells;
   wherein, a charge current is applied to the battery, the charge current including a high-voltage charging current component that is generated by the high-voltage battery charger and applied through the string of cells, and a low-voltage charging current component generated by each low-voltage battery charger and applied through each individual battery cell monitoring;
   the battery management system continually monitoring the voltage of each individual cell;
   wherein the battery monitoring system discontinues the high-voltage component of the charge current when at least one of the battery cells reaches a predetermined upper voltage limit;
   the battery management system discontinues the low-voltage component of the charge current to the at least one of the battery cells having reached the predetermined upper voltage limit;
   the low-voltage battery chargers continue to apply charge to the battery cells that have not reached the predetermined upper voltage limit; and
   wherein the battery management system discontinues the low-voltage charge current to each of the plurality of battery cells when the battery cells have reached the predetermined upper voltage limit.

* * * * *